(12) United States Patent
Kim et al.

(10) Patent No.: US 6,591,709 B1
(45) Date of Patent: Jul. 15, 2003

(54) LINEAR TILT MECHANISM

(75) Inventors: Tyler Kim, Novi, MI (US); Peter Escobedo, Jr., Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 13 days.

(21) Appl. No.: 10/067,721

(22) Filed: Feb. 4, 2002

(51) Int. Cl.$^7$ ................................................. B62D 1/18
(52) U.S. Cl. ........................................ 74/493; 280/775
(58) Field of Search ......................... 74/493, 495, 540; 70/181–187, 189, 252; 292/222, 224; 280/775

(56) References Cited

U.S. PATENT DOCUMENTS

| | | |
|---|---|---|
| 4,599,500 A | 7/1986 | Wilcox |
| 5,009,120 A * | 4/1991 | Iseler et al. ..................... 74/493 |
| 5,222,410 A * | 6/1993 | Kinoshita ..................... 74/493 |
| 5,265,492 A | 11/1993 | Snell |
| 5,301,567 A | 4/1994 | Snell et al. |
| 5,452,624 A | 9/1995 | Thomas et al. |
| 5,566,585 A | 10/1996 | Snell et al. |
| 5,743,151 A | 4/1998 | Khalifa et al. |
| 5,788,277 A * | 8/1998 | Hibino et al. ............... 280/775 |
| 5,823,062 A | 10/1998 | Snell et al. |
| 5,915,726 A * | 6/1999 | Hibino et al. ............... 280/775 |

* cited by examiner

Primary Examiner—William C Joyce
Assistant Examiner—Timothy McAnulty
(74) Attorney, Agent, or Firm—Ralph E. Smith

(57) ABSTRACT

An apparatus for releasably locking the tilt steering column assembly. The apparatus includes a housing, a lock member, a pawl, a rack and a rack trunnion. The rack and the rack trunnion, which are slidable relative to one another, form a link that determines the angle to which the tilt steering column is adjusted. The pawl is pivotably coupled to the rack trunnion and pivotable between a first position, wherein teeth formed on the pawl meshingly engage teeth formed on the rack to fix the position of the rack trunnion relative to the rack, and a second position, wherein the teeth of the pawl are rotated out of engagement with the teeth of the rack to permit the rack trunnion and the rack to be moved relative to one another. The lock member is disposed between a wall of the housing and the pawl such that relative movement of the housing toward the rack trunnion engages the lock member to the pawl and rotates the pawl into the first

16 Claims, 3 Drawing Sheets

LINEAR TILT MECHANISM

FIELD OF THE INVENTION

The present invention generally relates to tilt steering columns for automotive vehicles and more particularly to an apparatus for releasably locking a tilt steering column in adjusted opposition.

BACKGROUND OF THE INVENTION

Many automobiles have steering columns which can be tilted to an adjusted position selected by the vehicle operator. A locking mechanism is typically provided to maintain the steering column in its selected position. The known locking mechanisms include pawl-and-rack and rotary actuated designs. The known pawl-and-rack designs tend to be relatively complex and have difficulty in maintaining the steering column in its selected position when considerable force is applied to the steering column in a direction that is highly skewed to the axis of the steering column.

The rotary actuated designs appear to be relatively less complex, but in practice must address issues relating to vibration of the steering column as a result of the lash within these mechanisms. Attempts to minimize lash to thereby attenuate the vibration of the steering wheel typically utilize highly toleranced components and the matching of components to minimize lash and as such, these mechanisms tend to be relatively expensive to manufacture and service.

SUMMARY OF THE INVENTION

In one preferred form, the present invention provides an apparatus for releasably locking a tilt steering column of an automotive vehicle. The apparatus includes a housing, a rack, a first coupling member, a rack trunnion, a pawl member, a second coupling member, a pawl spring and a locking member. The housing has a central cavity and a slotted aperture that is formed through the housing and intersects the central cavity. The rack has a first trunnion mount and a rack body. The rack body includes a plurality of rack teeth and a first coupling aperture into which the first coupling member is disposed. The rack trunnion has a wall member and a first pivot trunnion. The wall member has a second coupling aperture formed therethrough, the first coupling member extending into the second coupling aperture and coupling the rack to the rack trunnion such that the rack and the rack trunnion are movable relative to one another along an axis that is generally perpendicular to an axis of the first coupling member, the first pivot trunnion being disposed in the housing and defining a first pivot aperture, the first pivot aperture being aligned to the slotted aperture. The pawl member has a second trunnion mount, which defines a second pivot aperture, a plurality of pawl teeth, which are configured to meshingly engage the rack teeth, and a locking cam. The second coupling member is disposed through the slotted aperture, the first pivot aperture and the second pivot aperture to pivotably couple the pawl member and the rack trunnion and slidably couple the housing to the pawl member and the rack trunnion. The spring is coupled to the pawl member and biases the pawl teeth out of engagement with the rack teeth. The locking member is coupled to the housing and extends into the central cavity. The apparatus is operable in an engaged condition, wherein engagement between the locking member and the locking cam of the pawl member overcomes the spring and rotates the pawl member toward the rack to cause meshing engagement of the pawl teeth and the rack teeth and thereby inhibit relative movement between the rack and the rack trunnion. The apparatus is further operable in a disengaged condition, wherein the spring rotates the pawl member away from the rack such that the pawl teeth are not meshingly engaged to the rack teeth to thereby permit relative movement between the rack and the rack trunnion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
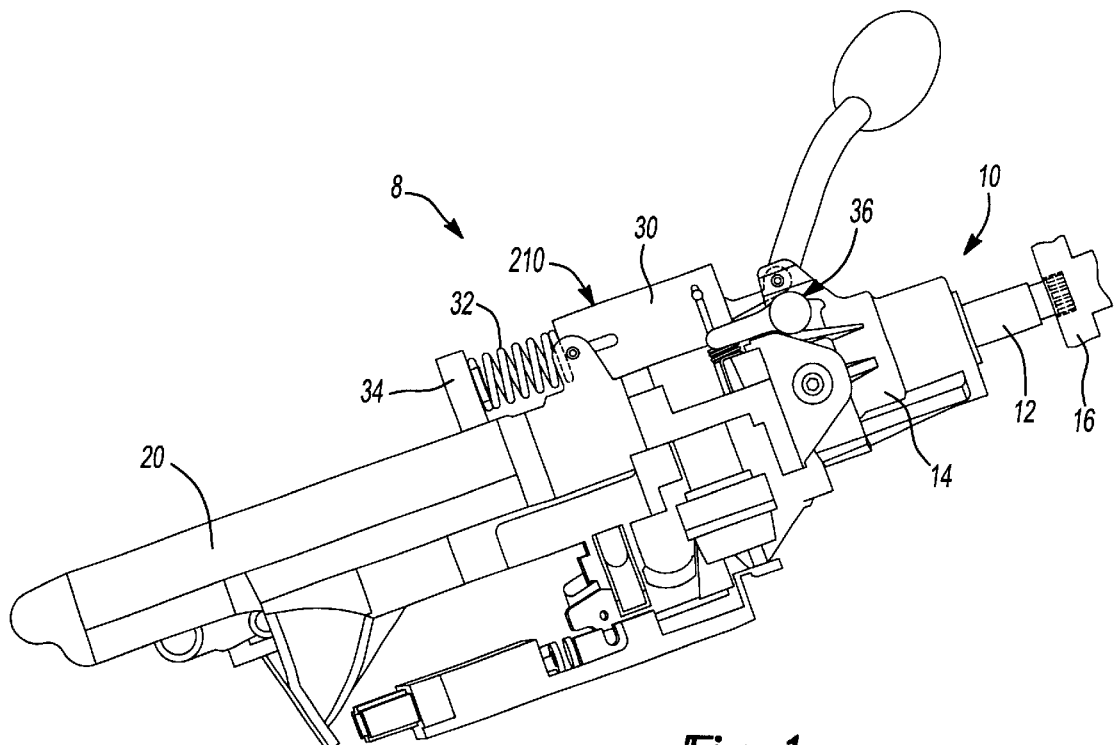
FIG. 1 is a side view of a steering column having a tilt lock apparatus constructed in accordance with the teachings of the present invention.
Figure 2:
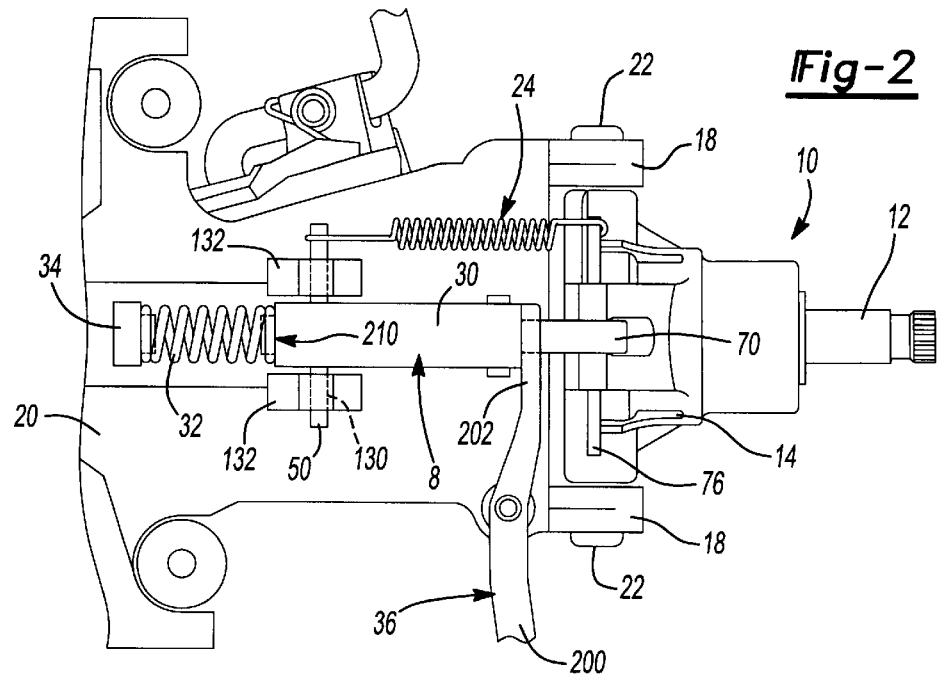
FIG. 2 is a top view of the steering column of FIG. 1.

With reference to FIGS. 1 and 2 of the drawings, a tilt lock apparatus constructed in accordance with the teachings of the present invention is generally indicated by reference numeral 8. The tilt lock apparatus 8 is illustrated in operative association with a steering column assembly 10 having a steering column 12 mounted in a housing 14, with a steering wheel 16 on the upper end of the steering column 12. The steering column housing 14 extends between a pair of trunnions 18 that are formed on a support structure 20 and is pivoted to the trunnions 18 by horizontal pivots 22 for vertical adjustment about an axis perpendicular to the longitudinal center line of the vehicle and of the steering column 12. The pivotal support for the housing 14 permits the steering column 12 to be adjusted vertically, as shown in FIG. 1 to a positioned desired by the vehicle operator, but within a range in which the steering column extends at an angle generally upwardly and rearwardly of the motor vehicle. A coil spring 24 is secured at its ends to the support structure 20 and to the housing 14 and urges the housing 14 to swing upwardly to a limiting position making ingress to and egress from the vehicle easier for the vehicle operator.

Figure 3:
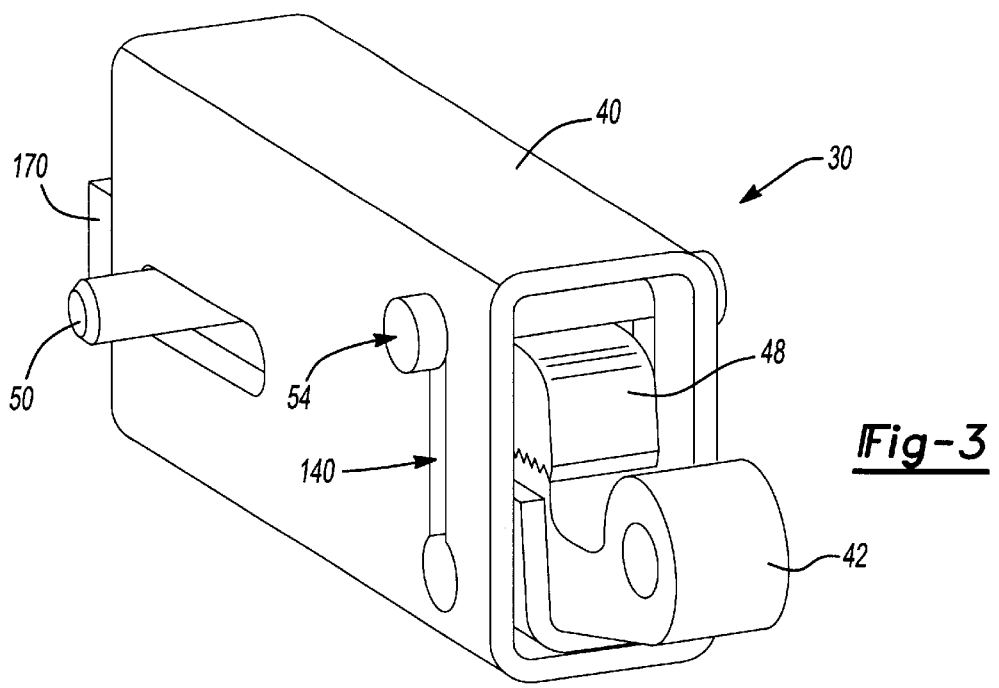
FIG. 3 is a perspective view of a portion of the steering column of FIG. 1 illustrating the lock mechanism in greater detail.
Figure 5:
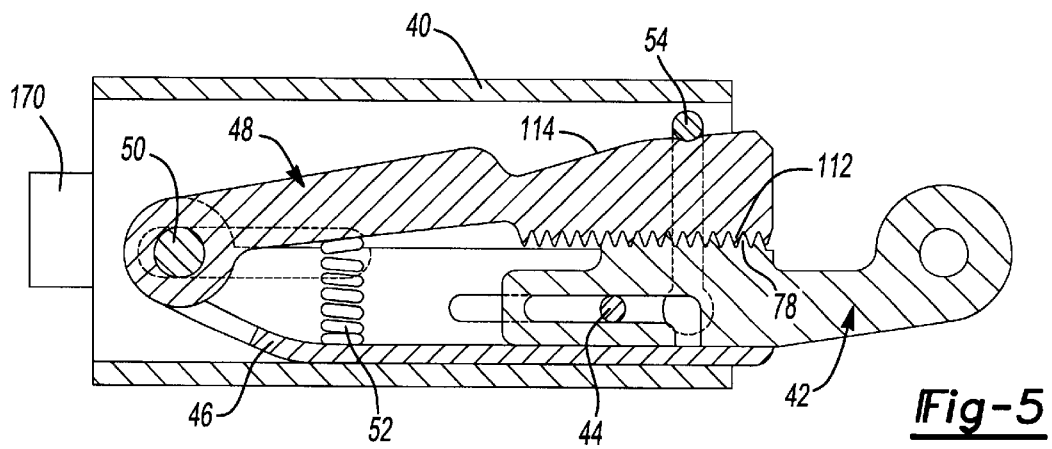
FIG. 5 is a sectional view of the lock mechanism illustrating the pawl teeth in meshing engagement with the rack teeth.
Figure 4:
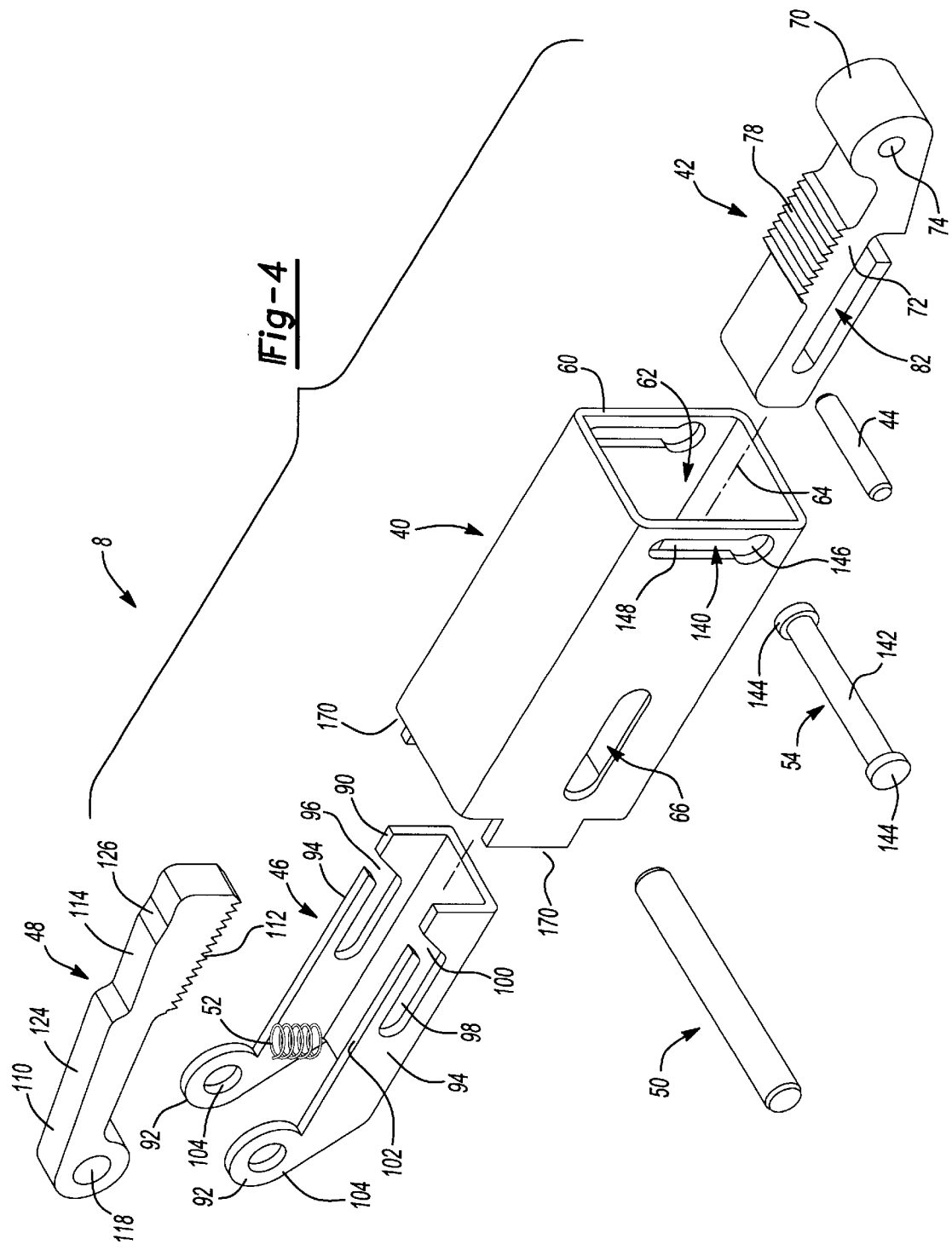
FIG. 4 is an exploded view of the lock mechanism.

With additional reference to FIGS. 3 and 4, the tilt lock apparatus 8 is shown to include a lock mechanism 30, a housing spring 32, a stationary plunger 34 and a tilt lock lever 36. The lock mechanism 30 includes a housing 40, a rack 42, a first coupling member 44, a rack trunnion 46, a pawl member 48, a second coupling member 50, a pawl spring 52 and a locking member 54. In the example illustrated, the housing 40 is shown to have a wall member 60 that is formed to provide the housing 40 with a generally rectangular tubular configuration. The wall member 60 thus defines a central cavity 62 that is formed along the longitudinal axis 64 of the housing 40. A slotted aperture 66 is formed through the housing 40.

Figure 6:
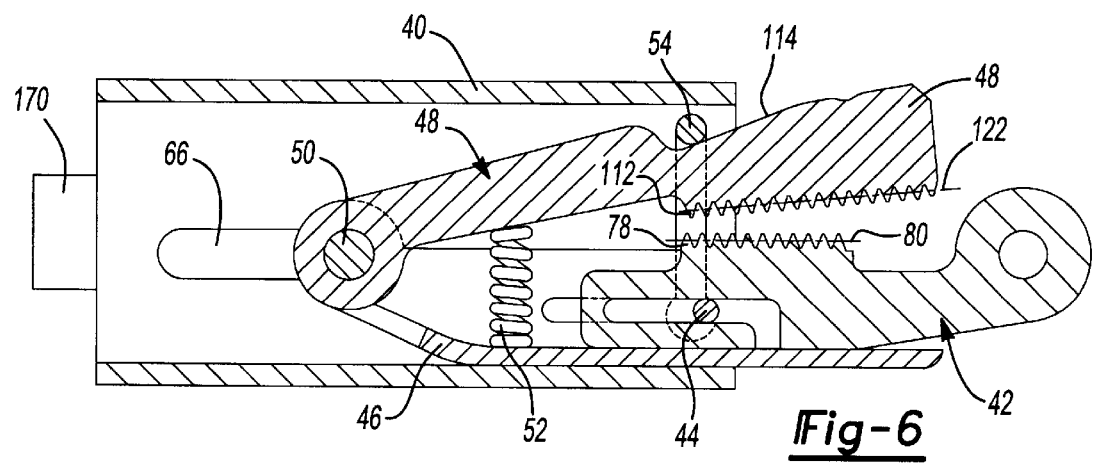
FIG. 6 is a sectional view similar to that of FIG. 5 but illustrating the housing slid rearwardly relative to the pawl member and the pawl member rotated away from the rack to disengage the pawl teeth from the rack teeth.

The rack 42 has a first trunnion mount 70 and a rack body 72. The first trunnion mount 70 includes a yoke pivot aperture 74 that is configured to receive a first pivot pin 76 (FIG. 2) that pivotably couples the rack 42 to the housing 14. The rack body 72 includes a plurality of rack teeth 78 that are spaced axially apart from the first trunnion mount 70 and which are defined by a pitch line 80 (FIG. 6). The rack body 72 also includes a first coupling aperture 82, which in the particular embodiment illustrated, is a cylindrical hole that is offset from the rack teeth 78.

The first coupling member 44 is illustrated to be a cylindrical pin that is disposed through the first coupling aperture 82 such that its axis is generally perpendicular to the pitch line 80 of the rack teeth 78. The first coupling member 44 is preferably sized in a slip-fit or running-fit manner relative to the first coupling aperture 82, but could also be sized relatively larger than the first coupling aperture 82 to thereby create an interference fit between the first coupling member 44 and the rack 42. Alternatively, the rack 42 and the first coupling member 44 may be integrally formed.

The rack trunnion 46 is illustrated to include a C-shaped body 90 and a pair of first pivot trunnions 92 that are fixed to the opposite sides 94 of the body 90. The sides 94 of the body 90 are spaced apart to receive the rack 42. A second coupling aperture 96, which is sized to receive the first coupling member 44, is formed through the sides of the body 90. In the example provided, the second coupling aperture 96 includes a first slotted portion 98 and a second slotted portion 100. The first slotted portion 98 is offset from and generally parallel to the upper edge 102 of the sides 94 of the body 90. The second slotted portion 100 intersects the first slotted portion 98 and tapers upwardely toward the upper edge 102 and rearwardly away from the first pivot trunnions 92. The first pivot trunnions 92 each define a first pivot aperture 104 having an axis that is generally perpendicular to the first slotted portion 98.

With the first coupling member 44 coupled to the rack 42 and disposed within the first slotted portion 98 of the second coupling aperture 96, the rack 42 and the rack trunnion 46 are movable relative to one another along an axis that is generally perpendicular to an axis of the first coupling member 44. The rack trunnion 46 is positioned relative to the housing 40 such that the first pivot trunnions 92 are disposed in the housing 40 and are aligned to the slotted aperture 66.

The pawl member 48 includes a second trunnion mount 110, a plurality of pawl teeth 112 and a locking cam 114. The second trunnion mount 110, which is disposed between the first pivot trunnions 92, defines a second pivot aperture 118. In the particular example provided, the pawl member 48 has a goose-neck configuration, wherein the pawl teeth 112 are spaced axially apart from the second trunnion mount 110 and formed along a pitch line 122 (FIG. 6) that intersects the centerpoint of the second pivot aperture 118. The locking cam 114 is defined by a portion of the upper surface 124 of the pawl member 48. The locking cam 114 tapers upwardly toward the end of the pawl member 48 opposite the second trunnion mount 110. A slight recess 126 is formed in the locking cam 114 just prior to the point at which the locking cam 114 intersects the end of the pawl member 48.

The pawl member 48 is positioned relative to the rack trunnion 46 such that the second trunnion mount 110 is disposed between the first pivot trunnions 92 and the second pivot aperture 118 is aligned to both the first pivot apertures 104 and the slotted aperture 66. The second coupling member 50, which is illustrated to be a cylindrically shaped pin, is disposed through the slotted aperture 66, the first pivot apertures 104, the second pivot aperture 118 and a third pivot aperture 130 (FIG. 2) formed in a pair of spaced apart trunnions 132 that are formed onto the support structure 20. The second coupling member 50 thereby pivotably couples the pawl member 48 to the rack trunnion 46, slidingly couples the housing 40 to the rack trunnion 46, and anchors the rack trunnion 46 relative to the spaced apart trunnions 132 that are formed onto the support structure 20. The pawl member 48 is thus rotatable between a first position, wherein the pawl teeth 112 are meshingly engaged to the rack teeth 78, and a second position, wherein the pawl teeth 112 are not meshingly engaged to the rack teeth 78. Accordingly, placement of the pawl member 48 in the first position operatively fixes the rack 42 relative to the rack trunnion 46, while placement of the pawl member 48 in the second position permits relative sliding movement between the rack 42 and the rack trunnion 46.

The pawl spring 52, which is illustrated to be a conventional coil spring, is disposed between the body 90 of the rack trunnion 46 and the pawl member 48 and is operable for urging the pawl member 48 toward the second position.

The locking member 54 is coupled to the housing 40 and is operable for contacting the locking cam 114 to position the pawl member 48 into the first position. In the particular example provided, the locking member 54 is a cylindrically shaped pin that is disposed in a second slotted aperture 140 formed through the housing 40 in a direction that is transverse to the longitudinal axis 64 of the housing 40. The locking member 54 includes a body portion 142 and a pair of heads 144 that are fixedly coupled to the opposite ends of the body portion 142. Each of the heads 144 has a diameter that is relatively larger than a diameter of the body portion 142. A first end 146 of the second slotted aperture 140 is formed to receive therethrough at least one of the heads 144, while the second end 148 of the second slotted aperture 140 is formed to receive therethrough only the body portion 142 of the locking member 54. Configuration in this manner ensures that the body portion 142 will not dislodge from the housing 40 during the operation of the tilt lock apparatus 8, but will permit the body portion 142 of the locking member 54 to rotate as it contacts the locking cam 114 to thereby reduce friction and enhance the performance of the tilt lock apparatus 8.

The housing spring 32, is illustrated to be a conventional compression spring and is disposed between the housing 40 and the stationary plunger 34 so as to exert a force on the housing 40 that biases the housing 40 away from the spaced apart trunnions 132 that are formed on the support structure 20. In the particular embodiment illustrated, the stationary plunger 34 is unitarily formed with the support structure 20, although those skilled in the art will understand that the stationary plunger 34 may also be separately formed. The stationary plunger 34 serves as a locating tab for maintaining a first end of the housing spring 32 in a predetermined position relative to the support structure 20. A pair of spring tabs 170 are formed onto the housing 40 and extend rearwardly into the interior of the housing spring 32 to thereby position the opposite end of the housing spring 32 relative to the housing 40. An optional protective sleeve (not shown) may be employed to cover a portion of the housing spring 32 to prevent other components in the vicinity of the steering column 12, such as wire harnesses (not shown), from being pinched between the coils of the housing spring 32 during the operation of the tilt lock apparatus 8.

The tilt lock lever 36 includes a handle 200, for receiving a rotary input from a vehicle operator, and a contact arm 202. The tilt lock lever 36 is mounted to the support structure 20 so as to pivot between a first rotational position and a second rotational position. Positioning of the tilt lock lever 36 into the first rotational position causes the contact arm 202 to push the end 210 of the housing 40 toward the spaced apart trunnions 132 that are formed on the support structure 20. As the locking member 54 is carried by the housing 40, the locking member 54 is moved toward the second trunnion mount 110 and away from the locking cam 114, thereby permitting the pawl spring 52 to rotate the pawl member 48 into the second position (as shown in FIG. 6) wherein the pawl teeth 112 are not meshingly engaged to the rack teeth 78. As mentioned above, this condition permits the link that is formed by the rack 42 and the rack trunnion 46 to be lengthened or shortened to thereby adjust the angle to which the tilt steering column 12 is adjusted.

With the tilt steering column 12 adjusted to a desired angle, the handle 200 of the tilt lock lever 36 is released and the housing 40 is urged in an opposite direction toward the housing 14 by the housing spring 32. The locking member 54, which is carried by the housing 40, traverses along the upper surface 124 of the pawl member 48. Contact between the locking member 54 and the locking cam 114 operably rotates the pawl member 48 into the first position wherein the pawl teeth 112 are meshingly engaged to the rack teeth 78. As mentioned above, this condition fixes the link that is formed by the rack 42 and the rack trunnion 46 and thereby maintains the angle of the tilt steering column 12 at the angle to which it has been adjusted.

While the tilt lock apparatus 8 has been described thus far in the context of the illustrated embodiment, those skilled in the art will appreciate that the invention, in its broader aspects, may be constructed somewhat differently. For example, the locking member 54 may be integrally formed with the housing 40. In this regard, the locking member 54 may be a tab that is bent over or into or the central cavity 62. As another example, the locking cam 114 may be formed into or coupled to the housing 40 and the locking member 54 may be formed onto or coupled to the pawl member 48.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An apparatus for releasably locking a tilt steering column of an automotive vehicle, the apparatus comprising:
    a housing having a central cavity and a slotted aperture, the slotted aperture being formed through the housing and intersecting the central cavity;
    a rack having a first trunnion mount and a rack body, the rack body including a plurality of rack teeth and a first coupling aperture;
    a first coupling member disposed in the first coupling aperture;
    a rack trunnion having a wall member and a first pivot trunnion, the wall member having a second coupling aperture formed therethrough, the first coupling member extending into the second coupling aperture and coupling the rack to the rack trunnion such that the rack and the rack trunnion are movable relative to one another along an axis that is generally perpendicular to an axis of the first coupling member, the first pivot trunnion being disposed in the housing and defining a first pivot aperture, the first pivot aperture being aligned to the slotted aperture;
    a pawl member having a second trunnion mount, a plurality of pawl teeth and a locking cam, the second trunnion mount defining a second pivot aperture, the pawl teeth being configured to meshingly engage the rack teeth;
    a second coupling member disposed through the slotted aperture, the first pivot aperture and the second pivot aperture, the second coupling member pivotably coupling the pawl member and the rack trunnion, the second coupling member slidably coupling the housing to the pawl member and the rack trunnion;
    a spring coupled to the pawl member and biasing the pawl teeth out of engagement with the rack teeth; and
    a locking member coupled to the housing and extending into the central cavity;
    the apparatus being operable in an engaged condition, wherein engagement between the locking member and the locking cam of the pawl member overcomes the spring and rotates the pawl member toward the rack to cause meshing engagement of the pawl teeth and the rack teeth and thereby inhibit relative movement between the rack and the rack trunnion;
    the apparatus being further operable in a disengaged condition, wherein the spring rotates the pawl member away from the rack such that the pawl teeth are not meshingly engaged to the rack teeth to thereby permit relative movement between the rack and the rack trunnion.

2. The apparatus of claim 1, wherein the first coupling aperture is a slot.

3. The apparatus of claim 2, wherein the slot is formed along an axis that is parallel a pitch line of the rack teeth.

4. The apparatus of claim 1, wherein the housing is a hollow rectangular tube.

5. The apparatus of claim 1, wherein the locking member is a cylindrically shaped pin.

6. The apparatus of claim 5, wherein the cylindrically shaped pin is disposed in a second slotted aperture that extends in a direction transverse to a longitudinal axis of the housing.

7. The apparatus of claim 6, wherein the cylindrically shaped pin includes a body portion and a pair of heads that are fixedly coupled to the opposite ends of the body portion, the heads having a diameter that is relatively larger than a diameter of the body portion, a first end of the second slotted aperture being formed to receive therethrough at least one of the heads and a second end of the second slotted aperture being formed to receive therethrough only the body portion.

8. The apparatus of claim 1, wherein the locking cam is a tapered surface that is skewed to a pitch line of the pawl teeth.

9. An apparatus for releasably locking a tilt steering column of an automotive vehicle, the apparatus comprising:

a support structure having first and second trunnions;

a lock mechanism, the lock mechanism including a housing, a rack, a first coupling member, a rack trunnion, a pawl member, a second coupling member, a pawl spring, and a locking member, the housing being movably mounted on the support structure along a translation axis, the housing having a central cavity and a slotted aperture, the slotted aperture being formed through the housing and intersecting the central cavity, the rack having a first trunnion mount and a rack body, the rack body including a plurality of rack teeth and a first coupling aperture, the first coupling member disposed in the first coupling aperture, the rack trunnion having a wall member and a first pivot trunnion, the wall member having a second coupling aperture formed therethrough, the first coupling member extending into the second coupling aperture and coupling the rack to the rack trunnion such that the rack and the rack trunnion are movable relative to one another along an axis that is generally perpendicular to an axis of the first coupling member, the first pivot trunnion being disposed in the housing and defining a first pivot aperture, the first pivot aperture being aligned to the slotted aperture, the pawl member having a second trunnion mount, a plurality of pawl teeth and a locking cam, the second trunnion mount defining a second pivot aperture, the pawl teeth being configured to meshingly engage the rack teeth, the second coupling member disposed through the slotted aperture, the first pivot aperture, the second pivot aperture and the first trunnion, the second coupling member pivotably coupling the pawl member and the rack trunnion, the second coupling member slidably coupling the housing to the pawl member and the rack trunnion, the pawl spring biasing the pawl member away from the rack, the locking member coupled to the housing and extending into the central cavity;

a spring coupled to the support structure and the housing, the spring exerting a spring force that biases the housing toward the second trunnion; and a tilt lock lever having a contact arm, the tilt lock lever being pivotably mounted to the support structure and movable between a first rotational position and a second rotational position;

wherein positioning of the tilt lock lever in the first rotational position permits the spring to bias the housing toward the second trunnion such that engagement between the locking member and the locking cam overcomes the pawl spring and rotates the pawl teeth of the pawl member into meshing engagement with the rack teeth of the rack to thereby inhibit relative movement between the rack trunnion and the rack; and wherein positioning of the tilt lock lever in the second rotational position translates the housing relative to the first trunnion such that the pawl spring is permitted to rotate the pawl member away from the rack so that the pawl teeth are not meshingly engaged to the rack teeth to thereby permit relative movement between the rack and the rack trunnion.

10. The apparatus of claim 9, wherein the first coupling aperture is a slot.

11. The apparatus of claim 10, wherein the slot is formed along an axis that is parallel a pitch line of the rack teeth.

12. The apparatus of claim 9, wherein the housing is a hollow rectangular tube.

13. The apparatus of claim 9, wherein the locking member is a cylindrically shaped pin.

14. The apparatus of claim 13, wherein the cylindrically shaped pin is disposed in a second slotted aperture that extends in a direction transverse to a longitudinal axis of the housing.

15. The apparatus of claim 14, wherein the cylindrically shaped pin includes a body portion and a pair of heads that are fixedly coupled to the opposite ends of the body portion, the heads having a diameter that is relatively larger than a diameter of the body portion, a first end of the second slotted aperture being formed to receive therethrough at least one of the heads and a second end of the second slotted aperture being formed to receive therethrough only the body portion.

16. The apparatus of claim 9, wherein the locking cam is a tapered surface that is skewed to a pitch line of the pawl teeth.

* * * * *